(12) United States Patent
Muth

(10) Patent No.: US 9,193,407 B2
(45) Date of Patent: Nov. 24, 2015

(54) ACTIVE DOWNFORCE GENERATION FOR A TILTING VEHICLE

(71) Applicant: John Austin Muth, Red Lodge, MT (US)

(72) Inventor: John Austin Muth, Red Lodge, MT (US)

( * ) Notice: Subject to any disclaimer, the term of this patent is extended or adjusted under 35 U.S.C. 154(b) by 142 days.

(21) Appl. No.: 13/972,706

(22) Filed: Aug. 21, 2013

(65) Prior Publication Data

US 2014/0058624 A1    Feb. 27, 2014

Related U.S. Application Data

(60) Provisional application No. 61/691,388, filed on Aug. 21, 2012.

(51) Int. Cl.
*G06F 7/00* (2006.01)
*B62J 99/00* (2009.01)
(Continued)

(52) U.S. Cl.
CPC ............... *B62J 99/00* (2013.01); *B60B 27/00* (2013.01); *B60B 27/0015* (2013.01); *B60B 27/0068* (2013.01); *B60B 27/02* (2013.01); *B60B 27/023* (2013.01); *B60B 27/042* (2013.01); *B62D 35/00* (2013.01); *B62D 37/00* (2013.01); *B62D 37/04* (2013.01); *B62J 27/00* (2013.01)

(58) Field of Classification Search
CPC .... B60B 27/00; B60B 27/0015; B60B 27/02; B60B 27/023; B60B 27/042; B60B 27/0068; B60B 27/047; B62D 35/00; B62D 37/04; B62D 37/00; B62D 37/06; B60W 2520/18; B60W 2720/125; B60W 30/045; B60W 17/00; B60W 17/0155

USPC ............ 701/36, 38, 72; 296/180.5; 301/37.25
See application file for complete search history.

(56) References Cited

U.S. PATENT DOCUMENTS 1,844,660 A    2/1932    Kastel
1,874,332 A    8/1932    Moore
(Continued)

FOREIGN PATENT DOCUMENTS

EP              1319526 A2    6/2003
WO       WO-2011/128037 A1    10/2011
WO       WO-2012/107165 A1    8/2012

OTHER PUBLICATIONS

"3DM(r)", [online]. © 2010 Microstrain, Inc. [archived on Nov. 26, 2010]. <URL: http://web.archive.org/web/20101126172905/http://microstrain.com/3dm.aspx>, (2010), 1 pg.

(Continued)

*Primary Examiner* — Thomas G Black
*Assistant Examiner* — Sze-Hon Kong
(74) *Attorney, Agent, or Firm* — Schwegman Lundberg & Woessner, P.A.

(57) ABSTRACT

An example can include a frame of a vehicle. An example can include at least two wheels coupled to the frame, wherein at least one of the wheels is configured to pivot around a steering axis. An example can include a cornering force sensor to measure a cornering force of the frame with respect to the surface and produce a cornering force signal. An example can include a thrust generation controller to receive the cornering force signal and to produce a desired downforce signal. An example can include and a thrust generator to receive the desired downforce signal and to pump air through at least one of the at least two wheels to produce lateral force on the wheel in association with the desired downforce signal.

18 Claims, 11 Drawing Sheets

(51) Int. Cl.

| | | |
|---|---|---|
| *B62D 37/00* | (2006.01) | |
| *B62D 35/00* | (2006.01) | |
| *B60B 27/04* | (2006.01) | |
| *B60B 27/00* | (2006.01) | |
| *B60B 27/02* | (2006.01) | |
| *B62D 37/04* | (2006.01) | |
| *B62J 27/00* | (2006.01) | |

(56) References Cited

U.S. PATENT DOCUMENTS

| | | | |
|---|---|---|---|
| 1,894,048 A | 1/1933 | Lilley | |
| 1,982,702 A | 12/1934 | Sperry, Jr. | |
| 2,020,239 A | 11/1935 | Coates | |
| 2,239,739 A | 4/1941 | Ruths et al. | |
| 2,304,153 A | 12/1942 | Di Cesare | |
| 2,394,974 A | 2/1946 | Bevins | |
| 2,416,541 A | 2/1947 | Michael | |
| 2,474,635 A | 6/1949 | Nichols | |
| 2,605,094 A | 7/1952 | Hancock | |
| 2,643,869 A | 6/1953 | Clark | |
| 2,836,348 A | 5/1958 | McDonald | |
| 2,844,660 A | 7/1958 | Fischer | |
| 3,073,168 A | 1/1963 | Adams et al. | |
| 3,370,460 A | 2/1968 | Haake et al. | |
| 3,432,856 A | 3/1969 | Buell et al. | |
| 3,466,935 A | 9/1969 | Lanni | |
| 3,958,897 A | 5/1976 | Connolly | |
| 4,129,316 A * | 12/1978 | Ebbert | 280/124.103 |
| 4,151,751 A | 5/1979 | McCaslin | |
| 4,511,170 A | 4/1985 | Sankrithi | |
| 4,586,335 A | 5/1986 | Hosoda et al. | |
| 4,593,953 A | 6/1986 | Baba et al. | |
| 4,615,260 A | 10/1986 | Takagi | |
| 4,939,982 A | 7/1990 | Immega et al. | |
| 4,989,466 A | 2/1991 | Goodman | |
| 5,054,844 A * | 10/1991 | Miwa | 296/198 |
| 5,111,847 A | 5/1992 | Hu et al. | |
| 5,184,304 A | 2/1993 | Huddle | |
| 5,212,977 A | 5/1993 | Stuart | |
| 5,419,608 A * | 5/1995 | Takemoto | 296/180.1 |
| 5,572,081 A | 11/1996 | Starck | |
| 5,774,832 A | 6/1998 | Vanderwerf | |
| 6,147,422 A | 11/2000 | Delson | |
| 6,192,684 B1 | 2/2001 | McBirney | |
| 6,211,598 B1 | 4/2001 | Dhuler et al. | |
| 6,349,900 B1 | 2/2002 | Uttley et al. | |
| 6,462,651 B1 | 10/2002 | Consiglio et al. | |
| 6,539,295 B1 * | 3/2003 | Katzen et al. | 701/33.6 |
| 6,575,522 B2 | 6/2003 | Borghi et al. | |
| 6,592,328 B1 | 7/2003 | Cahill | |
| 6,698,557 B2 | 3/2004 | Hayes et al. | |
| 6,926,346 B1 | 8/2005 | Wong et al. | |
| 7,169,822 B2 | 1/2007 | Oguro et al. | |
| 7,594,567 B2 | 9/2009 | Sabelstrom et al. | |
| 7,661,766 B2 | 2/2010 | Davis et al. | |
| 7,806,485 B1 * | 10/2010 | Nelson et al. | 301/37.25 |
| 7,834,865 B2 | 11/2010 | Jannasch et al. | |
| 8,333,438 B2 | 12/2012 | Caule | |
| 2002/0135850 A1 | 9/2002 | Hagelin et al. | |
| 2005/0052069 A1 * | 3/2005 | Gilly et al. | 301/6.1 |
| 2006/0087171 A1 * | 4/2006 | Riley et al. | 301/37.25 |
| 2007/0069573 A1 * | 3/2007 | Gabriel | 301/37.25 |
| 2007/0194553 A1 * | 8/2007 | Czysz | 280/275 |
| 2008/0129009 A1 * | 6/2008 | Czysz | 280/275 |
| 2008/0150314 A1 * | 6/2008 | Van Der Westhuizen | 296/78.1 |
| 2008/0184770 A1 | 8/2008 | Sato | |
| 2008/0238005 A1 * | 10/2008 | James | 280/5.509 |
| 2008/0319589 A1 | 12/2008 | Lee et al. | |
| 2009/0195053 A1 | 8/2009 | Kruse et al. | |
| 2010/0028150 A1 | 2/2010 | Lawson | |
| 2010/0090440 A1 * | 4/2010 | Reichstetter et al. | 280/293 |
| 2010/0156843 A1 | 6/2010 | Paleczny et al. | |
| 2010/0168958 A1 | 7/2010 | Baino | |
| 2011/0160977 A1 | 6/2011 | Matsuda | |
| 2011/0260524 A1 * | 10/2011 | Yin | 301/37.25 |
| 2012/0175203 A1 * | 7/2012 | Robertson | 188/264 A |
| 2012/0181765 A1 * | 7/2012 | Hill et al. | 280/62 |
| 2012/0213636 A1 | 8/2012 | Gallant et al. | |
| 2013/0013146 A1 * | 1/2013 | Marur | 701/36 |
| 2013/0096781 A1 | 4/2013 | Reichenbach et al. | |
| 2013/0328381 A1 * | 12/2013 | Holloway, II | 301/37.25 |

OTHER PUBLICATIONS

"Attitude control", Wikipedia®, the free encyclopedia. [online]. [retrieved on Aug. 20, 2013]. Retrieved from the Internet: <URL: http://en.wikipedia.org/wiki/Attitude_control>, 6 pgs.

"Automatic transmission", Wikipedia®, the free encyclopedia. [online]. [retrieved on Aug. 20, 2013]. Retrieved from the Internet: <URL:http://en.wikipedia.org/wiki/Automatic_transmission>, 8 pgs.

"Bicycle chain", Wikipedia®, the free encyclopedia. [online]. [retrieved on Aug. 20, 2013]. Retrieved from the Internet: <URL: http://en.wikipedia.org/wiki/Bicycle_chain>, 6 pgs.

"Chain drive", Wikipedia®, the free encyclopedia. [online]. [retrieved on Aug. 20, 2013]. Retrieved from the Internet: <URL: http://en.wikipedia.org/wiki/Chain_drive>, 5 pgs.

"Derailleur gears", Wikipedia®, the free encyclopedia. [online]. [retrieved on Aug. 20, 2013]. Retrieved from the Internet: <URL: http://en.wikipedia.org/wiki/Derailleur_gears>, 9 pgs.

"Dynamic positioning", Wikipedia®, the free encyclopedia. [online]. [retrieved on Aug. 20, 2013]. Retrieved from the Internet: <URL: http://en.wikipedia.org/wiki/Dynamic_positioning>, 16 pgs.

"File History of U.S. Appl. No. 13/365,790, filed Feb. 4, 2009", 117 pgs.

"Flight dynamics (spacecraft)", Wikipedia®, the free encyclopedia. [online]. [retrieved on Aug. 20, 2013]. Retrieved from the Internet: <URL: http://en.wikipedia.org/wiki/Flight_dynamics_(spacecraft)>, 12 pgs.

"Gear ratio", Wikipedia®, the free encyclopedia. [online]. [retrieved on Aug. 20, 2013]. Retrieved from the Internet: <URL: http://en.wikipedia.org/wiki/Gear_ratio>, 8 pgs.

"Gear train", Wikipedia®, the free encyclopedia. [online]. [retrieved on Aug. 20, 2013]. Retrieved from the Internet: <URL: http://en.wikipedia.org/wiki/Gear_train>, 4 pgs.

"Hub gear", Wikipedia®, the free encyclopedia. [online]. [retrieved on Aug. 20, 2013]. Retrieved from the Internet: <URL: http://en.wikipedia.org/wiki/Hub_gears>, 9 pgs.

"Inertial navigation system", Wikipedia®, the free encyclopedia. [online]. [retrieved on Aug. 20, 2013]. Retrieved from the Internet: <URL: http://en.wikipedia.org/wiki/Inertial_navigation_system>, 13 pgs.

"List of gear nomenclature", Wikipedia®, the free encyclopedia. [online]. [retrieved on Aug. 20, 2013]. Retrieved from the Internet: <URL: http://en.wikipedia.org/wiki/List_of_gear_nomenclature>, 25 pgs.

"Machine Translation of EP 1319526A2, published Jun. 18, 2003", 6 pgs.

"Machine Translation of WO 2011/128037A1, published Oct. 20, 2011", 5 pgs.

"Machine Translation of WO 2012/107165A1, published Aug. 16, 2012", 6 pgs.

"Manual transmission", Wikipedia®, the free encyclopedia. [online]. [retrieved on Aug. 20, 2013]. Retrieved from the Internet: <URL: http://en.wikipedia.org/wiki/Manual_transmission>, 15 pgs.

"Mechanical advantage", Wikipedia®, the free encyclopedia. [online]. [retrieved on Aug. 20, 2013]. Retrieved from the Internet: <URL: http://en.wikipedia.org/wiki/Mechanical_advantage>, 8 pgs.

"Pitch and Roll Micro-Electro-Mechanical Sensor (MEMS)—MicroTilt", [online]. [archived on Feb. 19, 2012]. Retrieved from the Internet: <URL: http://web.archive.org/web/20120219230910/http://www.cdltd.net/-Pitch-and-Roll-Micro-Electro-Mechanical-Sensor-MEMS-MicroTilt_18.html>, (2012), 1 pg.

(56) References Cited

OTHER PUBLICATIONS

"Propulsion Systems: Basic Concepts", [online]. [retrieved on Aug. 20, 2013]. Retrieved from the Internet: <URL: http://adg.stanford.edu/aa241/propulsion/propulsionintro.html>, 9 pgs.

"Rack and pinion", Wikipedia®, the free encyclopedia. [online]. [retrieved on Aug. 20, 2013]. Retrieved from the Internet: <URL: http://en.wikipedia.org/wiki/Rack_and_pinion>, 2 pgs.

"Sprocket", Wikipedia®, the free encyclopedia. [online]. [retrieved on Aug. 20, 2013]. Retrieved from the Internet: <URL: http://en.wikipedia.org/wiki/Sprocket>, 3 pgs.

"Timing belt", Wikipedia®, the free encyclopedia. [online]. [retrieved on Aug. 20, 2013]. Retrieved from the Internet: <URL: http://en.wikipedia.org/wiki/Timing_belt>, 1 pg.

"Toothed belt", Wikipedia®, the free encyclopedia. [online]. [retrieved on Aug. 20, 2013]. Retrieved from the Internet: <URL: http://en.wikipedia.org/wiki/Toothed_belt>, 3 pgs.

"Transmission (mechanics)", Wikipedia®, the free encyclopedia. [online]. [retrieved on Aug. 20, 2013]. Retrieved from the Internet: <URL: http://en.wikipedia.org/wiki/Transmission_(mechanics)>, 10 pgs.

* cited by examiner

ACTIVE DOWNFORCE GENERATION FOR A TILTING VEHICLE

CLAIM OF PRIORITY

This patent application claims the benefit of priority, under 35 U.S.C. Section 119(e), to Muth U.S. Provisional Patent Application Ser. No. 61/691,388, entitled "DOWNWARD/LATERAL FORCE DEVICE," filed on Aug. 21, 2012, which is hereby incorporated by reference herein in its entirety.

BACKGROUND

Creating downforce on a motorcycle is a problem recognized by the automotive industry, but with no satisfactory solution to date. Presently, there is not an efficient way to produce downforce on a motorcycle, such as in a turn. As an examples, presently, a MotoGP motorcycle can produce around 1.8 G-forces though a turn, while an F1 car, in part due to the downforce caused by their massive airfoils, can produce in excess of 4.3 G-forces.

There have been attempts to attach airfoils to the chassis of a motorcycle, similar to the approach used with four-wheeled vehicles. This can produce undesirable results, however. For example, a wing can produce downforce while the motorcycle is not leaning, which can even slow the motorcycle via drag, but may not help cornering. For example, as the motorcycle leans, the force generated by the airfoil can increase the stress on the tires, which can decrease cornering force. Further, the airfoil can undesirably load the suspension.

Because of these issues, motorcycles generally do not carry airfoil. As a consequence, the fastest cars are faster than the fastest motorcycles, such as around a given track, at a ratio of roughly 4:3, even though motorcycles accelerate much faster because of a lower weight-to-power ratio. Speed lost by automobiles to motorcycles in straight sections of a racetrack can be made up in the turns, because automobiles produce much more downforce in corners than motorcycles do.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Examples can provide downforce, lateral force, or both to a motorcycle in use, so as to improve the performance of the motorcycle. Examples can also provide lateral force for an automobile.

Examples can produce downforce and lateral force, such as when a motorcycle is leaning during a turn. The present subject matter provides an efficient way to produce downforce on a motorcycle through a turn. Examples can also produce lateral forces. Used in the wheels of an automobile (herein referring to a three or four-wheeled, non-leaning vehicle, but without limitation, as automobiles may lean in the future), examples can produce lateral force as well.

Figure 1:
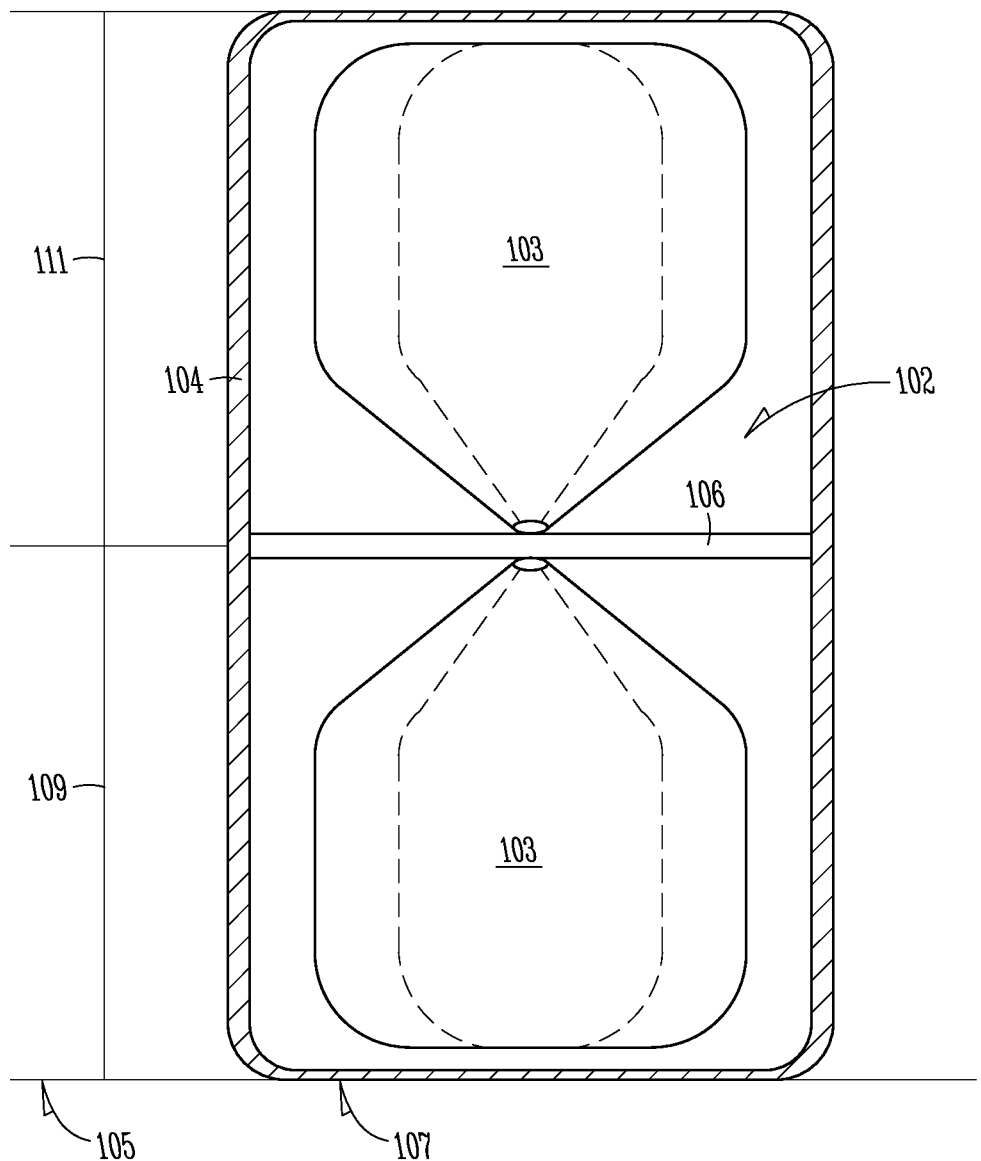
FIG. 1 shows a cross-sectional view of a wheel with a thrust generator, according to an example.

FIG. 1 shows a cross-sectional view of a wheel 104 with a thrust generator 102, according to an example. A variable pitch thrust generator 102, such as a propeller or fan including one or more blade 103, can be inside the wheel 104 of a vehicle such as a motorcycle or car, or any other wheeled vehicle, to provide force lateral to a wheel axle 106. This force can translate into lateral force for the vehicle. In the case of tilting vehicles, such as motorcycles, the force can translate into downforce. In both cases, the force can be used to improve cornering performance. A motorcycle or the wheel 104 at a full lean can be positioned above the road surface 105 at an angle of around 35 degrees with respect to the ground. Accordingly, at a full lean, examples can produce more downforce than lateral force.

Blades 103 can be fixed to the wheel 104 and can spin as the wheel 104 rotates. Additionally, the blades 103 can be fixed to a hub, that is wheel-mounted, that can spin faster, or slower, than the wheel 104. Blades can form spokes of the wheel 104.

In an example, the blades 103 can rotate to change their pitch, as shown by dashed lines of FIG. 1, relative to the plane of the wheel 104. A variable pitch mechanism can be used to cause the blades 103 to change their pitch, such as by rotating the blade with respect to the hub. A variable pitch mechanism, such as one used in a variable-pitch propeller airplanes, can be used. An example of a variable pitch mechanism is disclosed in U.S. Patent Application Publication No. 20080184770 to Kenji Sato, which is incorporated herein by reference in its entirety.

Examples can apply flow generation (e.g., thrust) to a motorcycle. In order to coordinate the application of thrust, examples can include a mechanism to recognize the lean of the motorcycle, and provide lean information that can be associated with blade pitch. A roll or lean sensor, for example including a gyro or ring lasers, can be used, such as to store the angle of the road or track 105 relative to the lean of the motorcycle in a register. A mechanism used in airplanes can be adapted to a vehicle, such as a motorcycle, to sense roll and pitch relative to the driving surface 105. A laser can measure the surface 105 of the road, such as through scanning, and input a measurement of the surface into a device to determine lean. A thrust generation controller can receive lean information and recognize if the motorcycle is leaning one way, and optionally how far it is leaning, and adjust blade pitch accordingly.

An automobile can also benefit from thrust generation. Lateral force can be generated to assist the automobile with cornering. Examples can include wheels that tilt with respect to the driving surface 105, and thus apply downforce to the automobile chassis. A thrust generation controller can receive a signal including turn information. For example, steering angle can be sensed and used as an input to a thrust generation controller. In steer-by-wire vehicles, the steering angle information is known by a body information computer, and such can be communicated with a thrust generation controller, such as via bus communications.

Blades 103 of a wheel-mounted thrust generator 102 can turn at a graduated rate associated with, such as correlated to, the lean of the motorcycle or turning of the wheels of the car. Blades can optionally turn fully to a fixed position once the motorcycle starts to lean, or a car starts to turn. A rider can select between modes based on preference.

One benefit of a wheel-mounted thrust generator is that the thrust generator may not load the suspension as unfavorably as a frame-mounted airfoil. thrust generation controller can recognize certain undesirable suspension loading states and control the thrust generation to avoid those states. Alternatively, sensors can monitor suspension activity, and a closed-loop algorithm can be used to determine whether an undesirable load state has been reached, and adjust thrust generation accordingly. The downforce wheel would not put as much stress on the suspension, another important point to consider.

In some examples, to prevent the thrust generator from "launching" debris sucked off the riding surface 105, a screen or guard can be used to resist the passage of large debris, while permitting air to pass through the thrust generator 102.

One drawback of fixed-wing aerodynamics is that they slow the vehicle's top speed by creating drag. The present subject matter provides for thrust deactivation by adjusting the blades 103 to stop generating thrust during certain operational modes, such as when the vehicle is not turning.

In an example, a thrust generation controller can correct for a phenomenon in which the bottom 109 of the wheel 104, such as a bottom half, is not moving at all with respect to the surface 105, while the top 111 of the wheel 104 is moving faster than the vehicle chassis. Thus, in some examples, such as those in which the blade rotations correlate with the wheel rotations, the blade pitch can be adjusted, per rotation, to apply a desired force profile to the wheel 104, such as to pushing down on a contact patch 107, optionally using the wheel 104 as a lever to do so.

Another way to address this phenomenon is to decouple the blades from the wheel. Blades 103 can spin faster than the wheel 104 itself. Any number of actuators can be used, including electric motors, hydraulic drives, and mechanical drives, such as those using gears or a clutch or both to couple and decouple the thrust generator 102 to a torque generator (e.g., and engine or a drivetrain component connected thereto). In an example, the thrust generator 102 including blades 103 can be housed within the wheel 104, and torque can be transmitted to a hub of the wheel to which the blades 103 are mounted, with the torque turning the blades 103.

In an example, a gear reduction can cause the blades 103 to spin faster than the wheel 104. Blades 103 of the thrust generator 102 can be fixed to always spin faster than the wheel 104 as a result of the gears always being active. Alternatively, there can be a mechanism, such as a clutch, that can engage the gears at a desired time, e.g., during lean, when a certain speed is reached, or both). Alternatively, in a clutchless system, gears can be engaged, such as through the use of a synchronizer, after a certain speed is reached. In such a system, a rotational speed difference between the blades 103 and the wheel 104, for example, could trigger actuation of a transmission to drive the blades 103 of the thrust generator 102. The hub mounted to the blades 103 can include a portion of a drivetrain to activate the thrust generating drivetrain. An actuator (e.g., a hand-controlled actuator), can actuate the thrust generating drivetrain. A stand-alone component, such as a computer controlled actuator, can actuate the thrust generating drivetrain. A pitch varying mechanism can be configured to engage gears to adjust blade pitch simultaneously with, or in sequence with, driving a hub to which the blades 103 are mounted.

Figure 2:
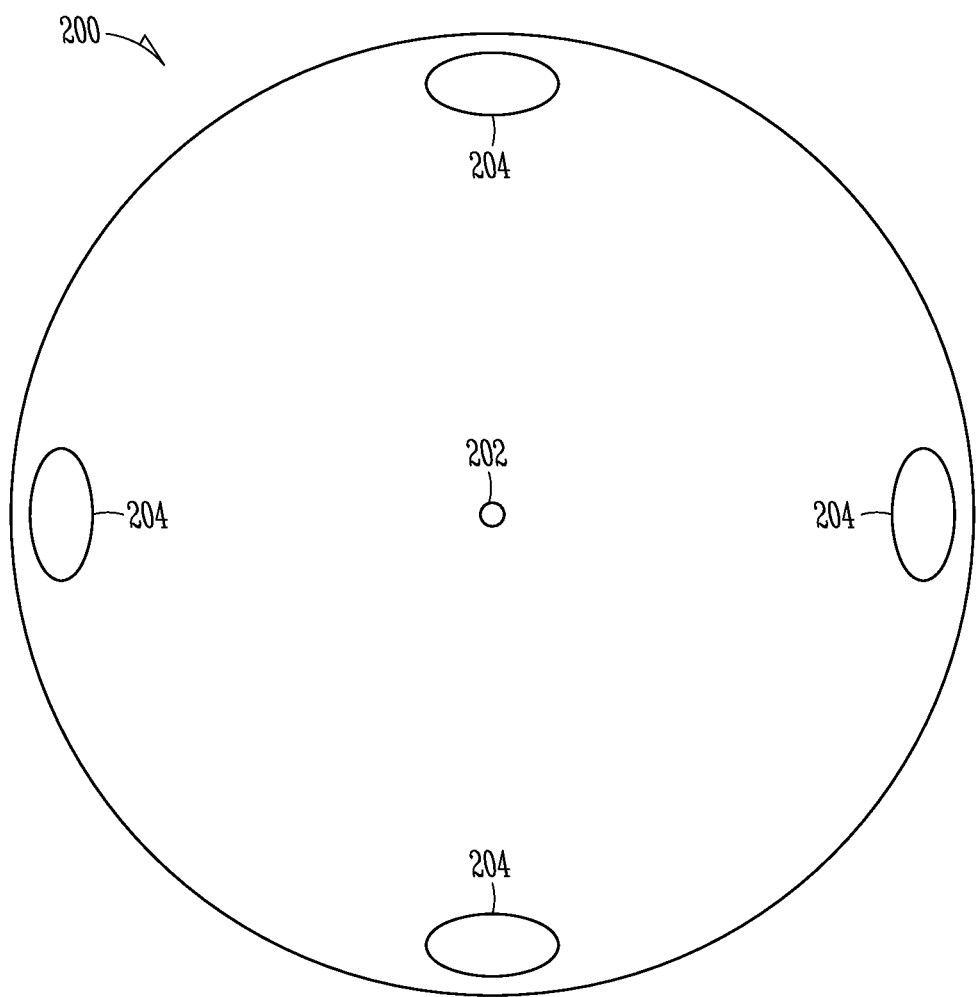
FIG. 2 is a side view of a hub, according to an example.

FIG. 2 is a side view of a hub 200, according to an example. The hub 200 can be mounted, such as to an axle via an axle eyelet 202. The hub 200 can include one or more actuators 204. The actuators 204 can be coupled to the hub 200, so as to be rotatable therein. The actuators 204, for example, can be female and splined to receive blades. The actuators 204 can rotate with respect to the hub 200 to adjust the pitch of one or more blades.

The blades can be mounted to a gimbal. Blade pitch can be adjusted during a single rotation of the hub 200 or the wheel. This is helpful to accommodate that the portion of the wheel located below the axle is moving at low or no speed with respect to the riding surface, while a portion of the wheel above the axle is moving forward faster than the axle. To take advantage of this, the pitch of the blade can be adjusted to apply maximum thrust above the axle, while providing little or no thrust below the axle. This thrust can apply a moment to the wheel, around the axle. This moment can tend to lift the wheel off a surface. Thus, in some examples, the thrust can be reversed or adjusted in magnitude to improve cornering force.

Figure 3:
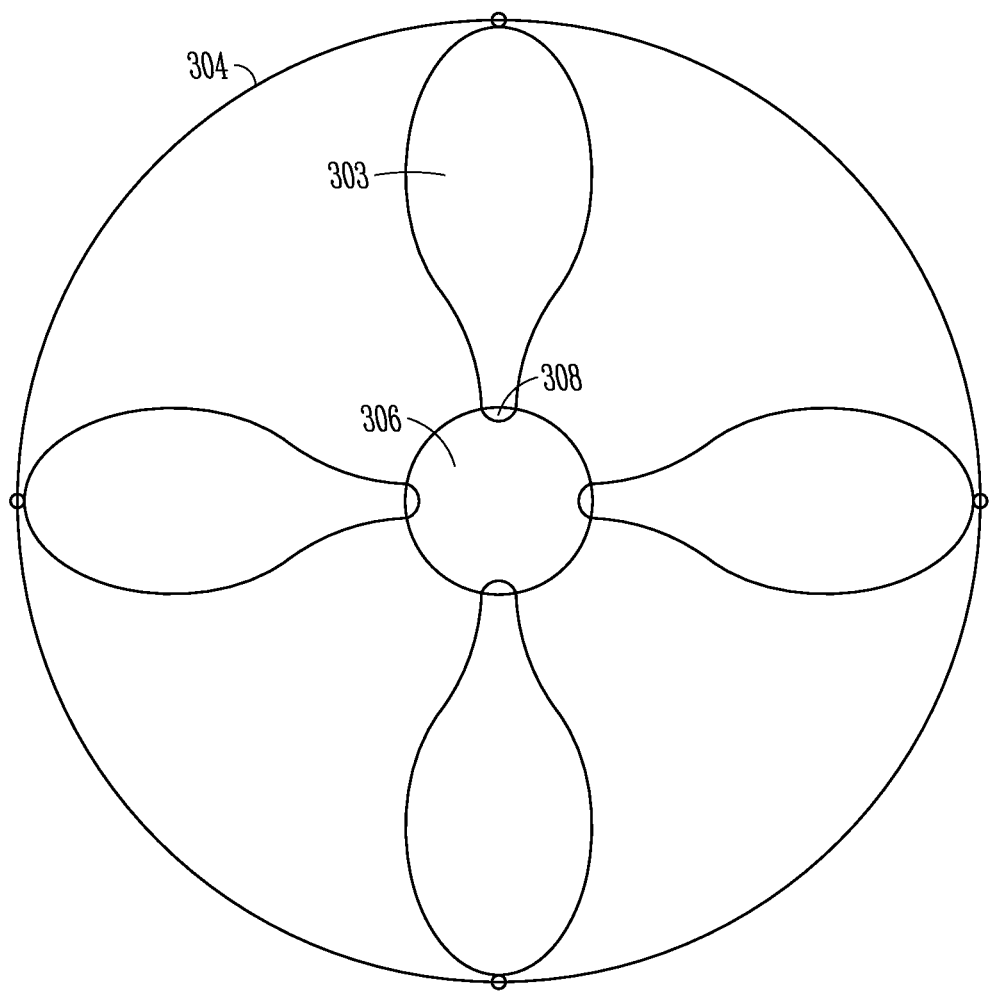
FIG. 3 is a side view of a hub coupled with blades, according to an example.

FIG. 3 is a side view of a hub 306 coupled with blades 303, according to an example. In the example, four blades 303 can serve to generate thrust and support a vehicle. In such an example, the blades 303 are coupled to a rim 304 and the hub 306. The blades can be adjusted by an actuator 308. The actuator can be disposed in the hub 306.

Figure 4A:
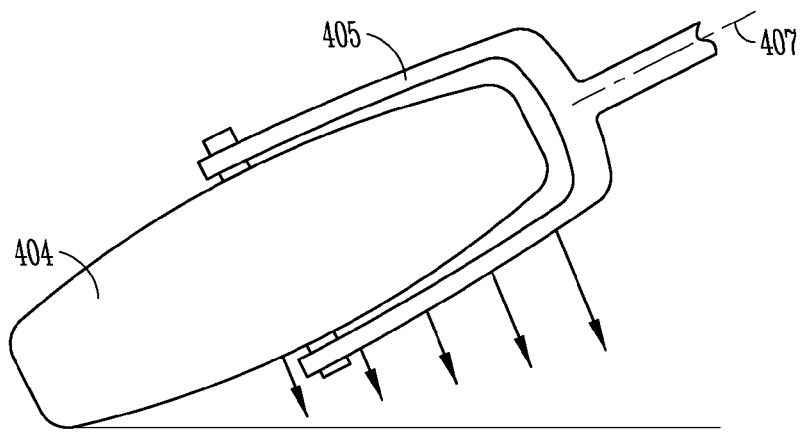
FIG. 4A is a tilting wheel, indicating downforce generated by a thrust generator, according to an example. Arrows show direction and are not limited to indicated magnitude.
Figure 4B:
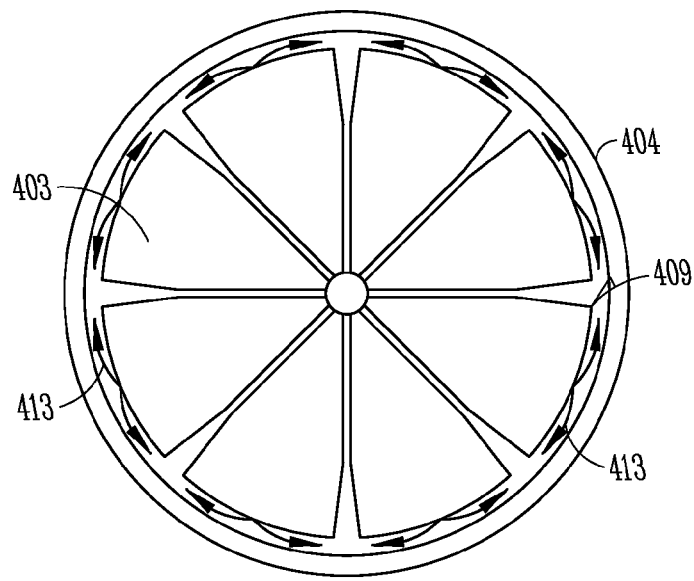
FIG. 4B is a side view of the wheel of FIG. 4A.
Figure 4C:
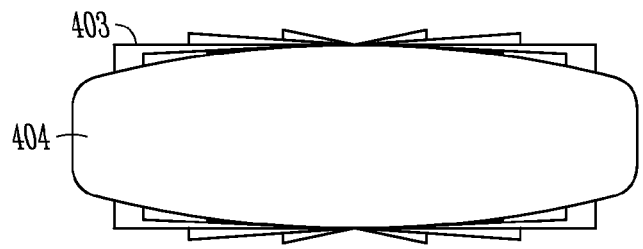
FIG. 4C is a top view of the wheel of FIG. 4A.

FIG. 4A is a tilting wheel 404, indicating downforce generated by a thrust generator, according to an example. Arrows show direction and are not limited to indicated magnitude. FIG. 4B is a side view of the wheel 404 of FIG. 4A. FIG. 4C is a top view of the wheel 404 of FIG. 4A. The wheel 404 is shown tilted in FIG. 4A, with arrows indicating the direction the thrust is forcing the wheel. The wheel 404 can be mounted to a frame 405. The example can include at least two wheels coupled to the frame, wherein at least one of the wheels is configured to pivot around a steering axis 407. FIG. 4B illustrates 8 blades 403 that are hub-mounted to a hub. The blades 403 are not necessarily coupled to the wheel rim on their distal end 409, and can rotate independently of some other rim-to-hub connector (e.g., spokes). Each of the blades 403 can be independently adjusted for pitch, as shown by arrows 413 at the distal end 409 of each blade 403. As pictured in FIG. 4C, the blades 403 can optionally extend outside the envelope (e.g., beyond the perimeter of the wheel 404) of the wheel 404. This can place the blades 404 in an area of higher air-pressure than inside the wheel 404, which can be lower than atmospheric pressure at speed due to low pressure in the wheel 404 caused by the front of the wheel 404 passing through the atmosphere. That is, the blades 403 can extend outside the wheel 404 to use higher-pressure air in thrust generation.

The blades 403 can be coupled to a brushless electric motor that is digitally controlled. Electricity for the brushless electric motor can be supplied by a battery of the motorcycle, which can be an accessory battery, or one used as a power source for a prime mover.

Figure 5:
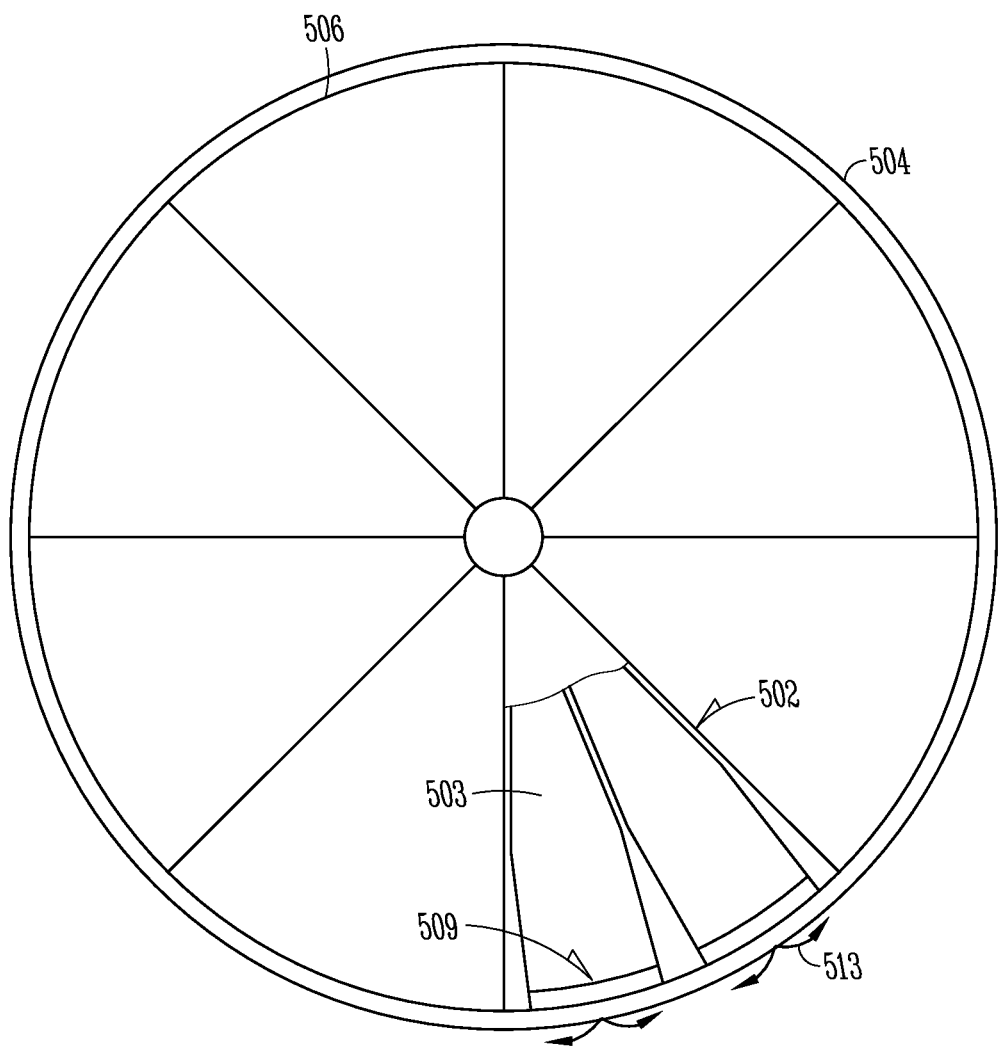
FIG. 5 is a partial side view of a wheel with a thrust generator, according to an example.

FIG. 5 is a partial side view of a wheel 504 with an exemplary thrust generator 502. In the example, the distal end 509 of the blades 503 is positioned substantially close to the rim 506 to improve efficiency of the thrust generator 502, such as a fan, simulating a squirrel-cage design.

Figure 6:
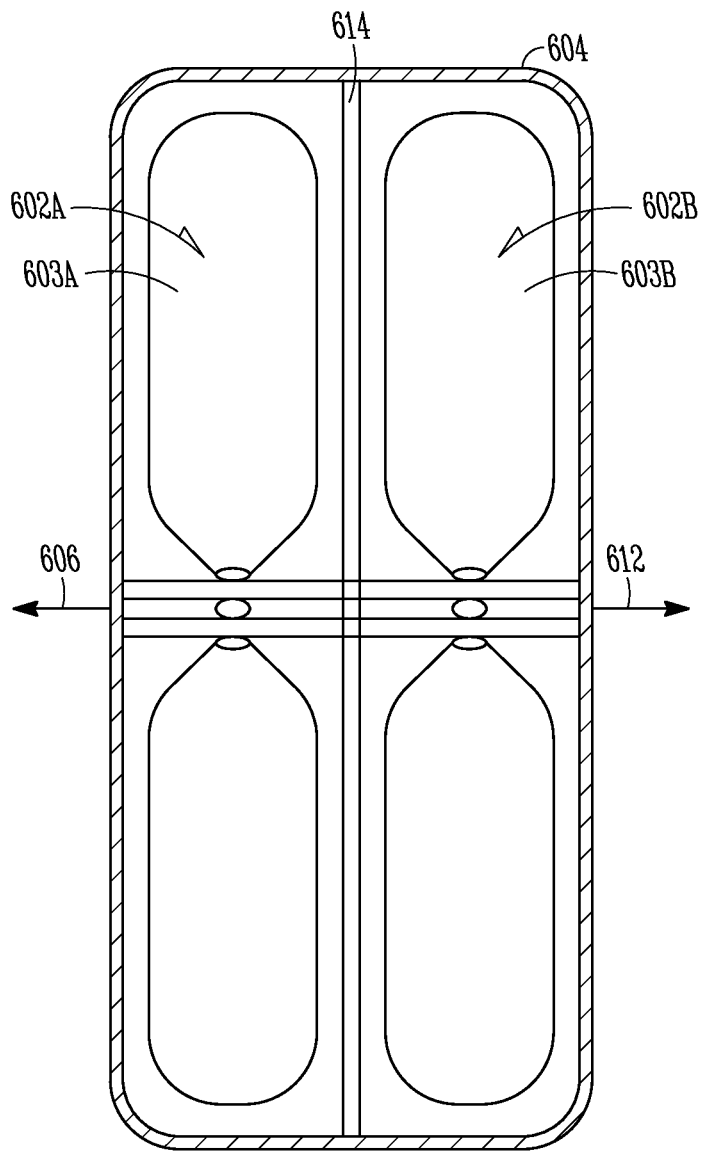
FIG. 6 shows a cross-sectional view of a wheel with two thrust generators, according to an example.

FIG. 6 shows a cross-sectional view of a wheel 604 with two thrust generators 602-A, 602-B, according to an example. In an example, the blades 603-A, 603-B can have a fixed pitch, optionally fixed to a pitch correlated to optimized efficiency at a desired speed. The blades 603-A, 603-B can be variable pitch, such as adjustable to a pitch correlated to optimized efficiency at a selected speed. The first thrust generator 602-A including the blades 603-A can direct air flow in a first direction 606. The second thrust generator 602-B including the blades 603-B can direct air flow in a second direction 612 (e.g., the same as the first direction 606 or different than the first direction 606).

A two thrust generator approach, such as shown in FIG. 6, can be used to accommodate central spoke 614. Both thrust generators can be used to generate downforce in one direction or the other, according to preference.

Figure 7:
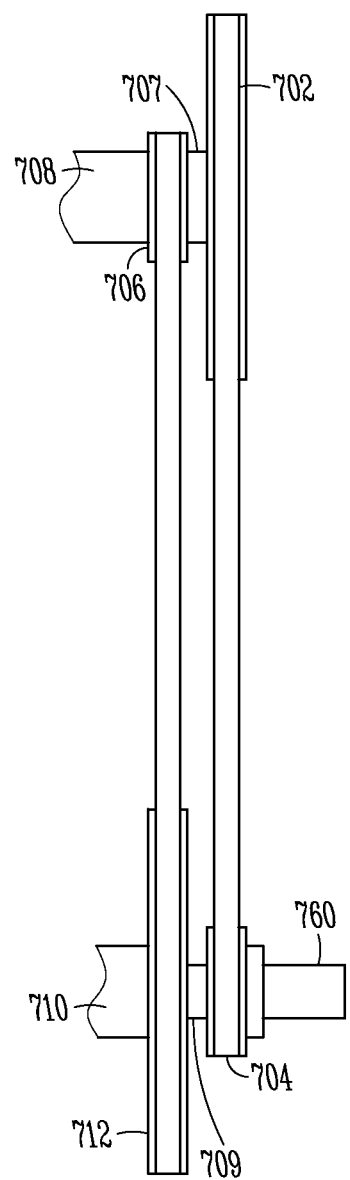
FIG. 7 shows an exemplary drive train for a thrust generator.
Figure 8:
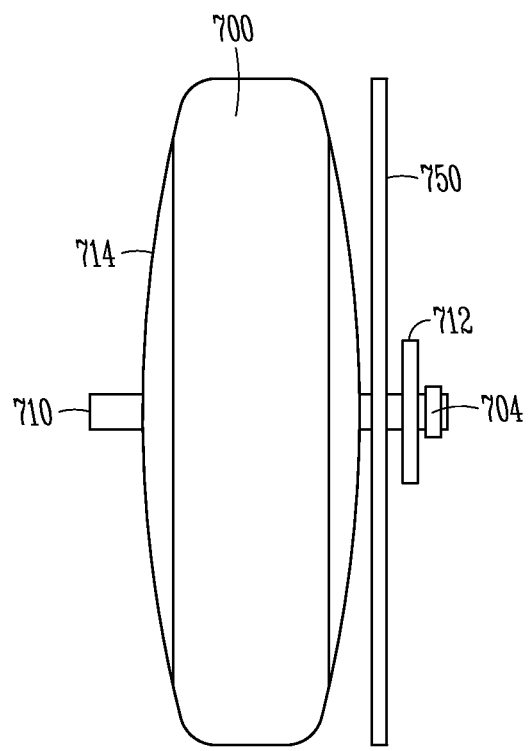
FIG. 8 shows a top view of a wheel compatible with the drive train of FIG. 7, according to an example.
Figure 9:
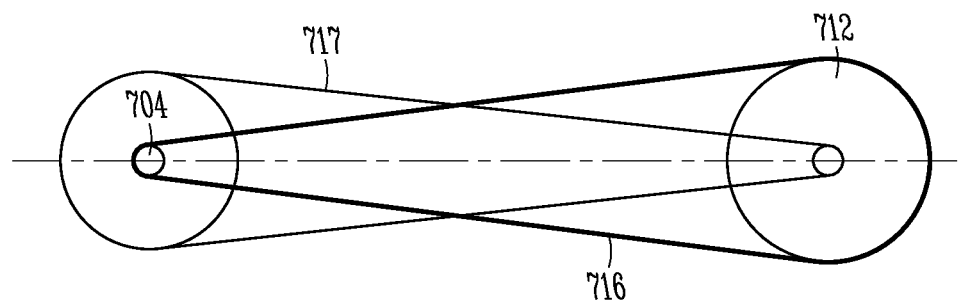
FIG. 9 is a side view of a drive train to power a thrust generator, according to an example.

FIG. 7 shows an exemplary drive train for a thrust generator. In the pictured embodiment, the thrust generator is in a direct-drive relationship with the crankshaft of the motorcycle. FIG. 8 shows an end view of a wheel compatible with the drive train of FIG. 7, according to an example. FIG. 9 is a side view of a drive train to power a thrust generator, according to an example. A thrust drive gear or pulley pinion 702 can be coupled to a first internal shaft 707. The first internal shaft can be rotatably disposed in a first outer shaft 708. A primary drive gear or pulley pinion 706 can be coupled to the outer shaft 708. Thus, a transmission component, such as an internal transmission component, can rotate the internal shaft 707 at a speed other than a rotational speed of the transmission output 708.

A thrust drive gear or pulley sprocket 704 can be coupled to a second internal shaft 709. The second internal shaft can be rotatably disposed in a second outer shaft 710. A primary drive gear or pulley sprocket 712 can be coupled to the outer shaft 708. Thus, a transmission component, such as an internal transmission component, can rotate the internal shaft 707 at a speed other than a rotational speed of the transmission output 708.

Configured as such, the blades (e.g., 103 of FIG. 1) of the thrust generator can spin at a higher rotation rate than the wheel. The transmission output can be only for the thrust generator, and can include gear amplification, higher or lower, as desired. The illustrated example can power a thrust generator without a thrust generator-specific output shaft from the engine/transmission assembly. An axle 710 for the blades and wheel can include components that are coaxially mounted, such as with splines. An actuator can be used to adjust the position of a pitch adjuster 760, moving it inside the axle 710, such as to slide in and out. The sliding motion can be tied to blades, with the sliding the pitch adjuster 760 adjusts the pitch of one or more blades adjusting pitch. Control can be provided by a controller, as set forth herein.

As shown in FIG. 8, a wheel 700 is coupled to an axle 710 via spokes 714. Additionally, a wheel sprocket 712 and a thrust generator sprocket 704 are also coupled with the axle 710. This illustrated example provides for a thrust generation that can spin blades faster than the wheel 700 spins. A chain or belt 716 or 717 as illustrated in FIG. 9, can be used to efficiently drive the sprockets 712, 704. Optionally, a shield 750, as shown in FIG. 8, can be mounted to the axle 710 to resist pumping debris through the wheel 700.

Figure 10:
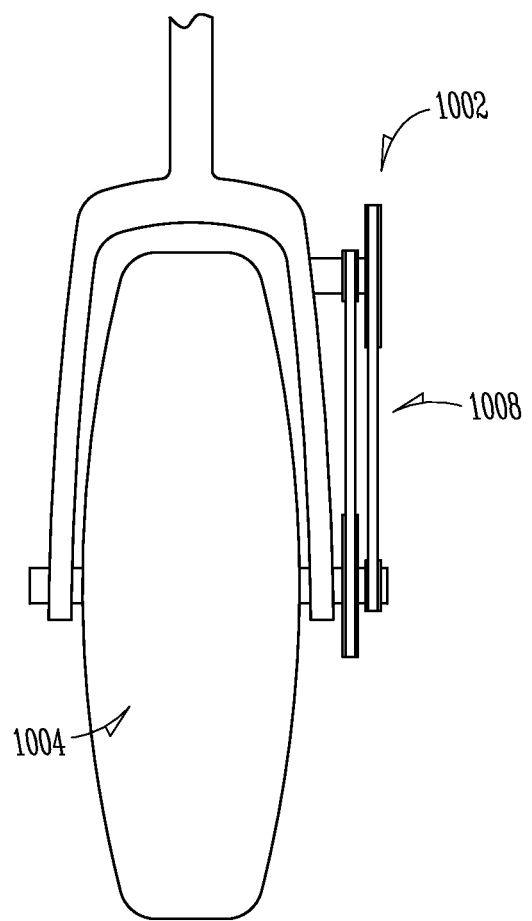
FIG. 10 is a top view of a wheel and a thrust generator drive train, according to an example.

FIG. 10 is a front view of a wheel 1004 and a thrust generator drive train 1008, according to an example. In the example, torque is generated at the top 1002 of the wheel 1004. This torque could be via a hydrostatic drive, for example. The drive mechanism 1008, functioning as the mechanism described in reference to FIGS. 7-9, can be used to drive a thrust generator, as described herein.

Figure 11:
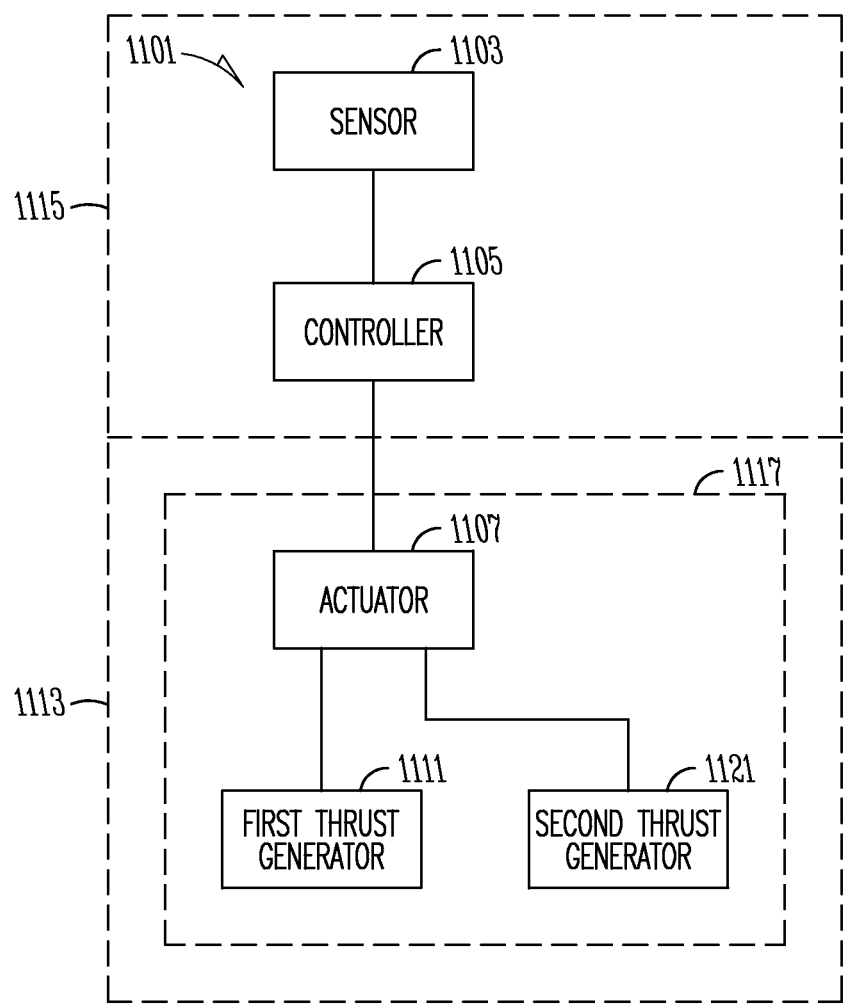
FIG. 11 is a system view of an active downforce system for a tilting vehicle, according to an example.

FIG. 11 is a system view of an active downforce system 1101 for a tilting vehicle, according to an example. The system 1101 can include a sensor 1103, such as a lean sensor, or a device to measure distance to the. The sensor 1103 can be coupled to a frame 1115 of a vehicle. The example can include a cornering force sensor to measure a cornering force of the frame with respect to the surface and produce a cornering force signal. In an example, the sensor 1103 includes an accelerometer. The example can include a thrust generation controller 1105 to receive the cornering force signal and to produce a desired downforce signal. The example can include a thrust generator 1117 that can be mounted to a wheel 1113. The thrust generator 1117 can include an actuator 1107 to receive the desired downforce signal. The actuator can perform any number of functions including, but not limited to, engaging a fan, changing fan rotation speed, and/or changing blade pitch, to pump air through a wheel 1113 to produce lateral force on the wheel in association with the desired downforce signal. The shield 750 can be gas permeable. The actuator 1107 can be an electric motor to turn the blades of the thrust generator 1117.

The sensor 1103 can be a tilt sensor to measure a tilt of the frame 1115 with respect to the riding surface and produce a tilt signal, wherein the thrust generation controller 1105 can receive the tilt signal and pump air through the at least one wheel 1113 in association with the tilt signal.

In an example, a first thrust generator 1111 and a second thrust generator 1121 can be used to produce equal amounts of thrust.

Figure 12:
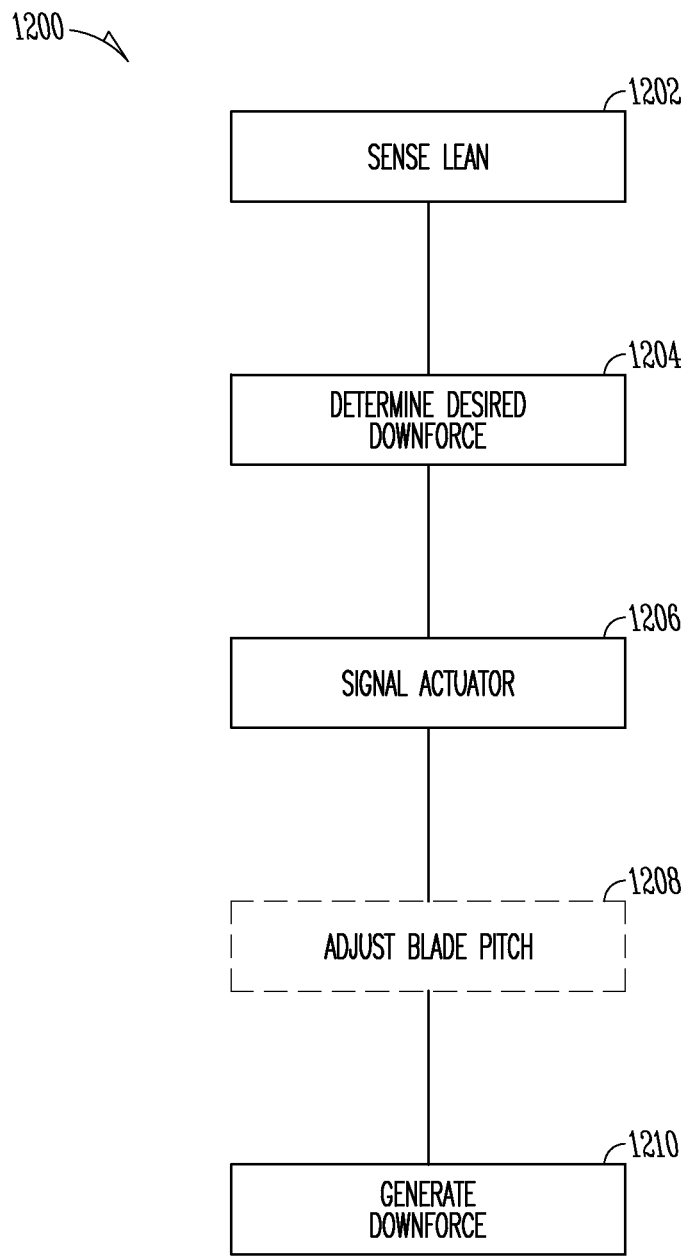
FIG. 12 is a method of providing active downforce for a tilting vehicle, according to an example.

FIG. 12 is a method 1200 of providing active downforce for a tilting vehicle, according to an example. At 1202, an example can comprise sensing a lean of a motorcycle. At 1204, an example can include determining a desired downforce to apply to the motorcycle. At 1206, an example can include signaling to an actuator to actuate a wheel-mounted fan to generate lateral thrust through the wheel. Optionally, at 1210, an example can adjust a blade pitch of the wheel-mounted fan. At 1212, the method can include generating downforce, such as for a motorcycle, while turning.

Notes and Examples

Example 1 can include an apparatus for rolling on a surface. The Example can include a frame of a vehicle. The Example can include at least two wheels coupled to the frame, wherein at least one of the wheels is configured to pivot around a steering axis. The Example can include a cornering force sensor to measure a cornering force of the frame with respect to the surface and produce a cornering force signal. The Example can include a thrust generation controller to receive the cornering force signal and to produce a desired downforce signal. The Example can include a thrust generator to receive the desired downforce signal and to pump air through at least one of the at least two wheels to produce lateral force on the wheel in association with the desired downforce signal.

Example 2 can include any of the subject matter of any of claim 1, comprising a tilt sensor to measure a tilt of the frame with respect to the surface and produce a tilt signal, wherein the thrust generation controller is to receive the tilt signal and to pump air through the at least one wheel in association with the tilt signal.

Example 3 can include any of the subject matter of any of the previous examples, wherein the cornering force sensor includes the tilt sensor, and the cornering force signal includes the tilt signal.

Example 4 can optionally include the subject matter of any of the previous Examples, comprising a gas permeable shield covering the thrust generator.

Example 5 can optionally include the subject matter of any of the previous Examples, wherein the thrust generator comprises a plurality of hub-mounted blades mounted to at least one of a front wheel and a back wheel.

Example 6 can optionally include the subject matter of any of the previous Examples, wherein at least some of the plurality of hub-mounted blades are of an adjustable pitch.

Example 7 can optionally include the subject matter of any of the previous Examples, wherein at least some of the plurality of hub-mounted blades are configured to adjust pitch during a single rotation, such as intra-rotation.

Example 8 can optionally include the subject matter of any of the previous Examples, wherein a hub mounted to the plurality of hub-mounted blades is fixed to rotate in parity with the front wheel.

Example 9 can optionally include the subject matter of any of the previous Examples, wherein a hub mounted to the plurality of hub-mounted blades is fixed to rotate at a speed other than a speed of rotation of the front wheel.

Example 10 can optionally include the subject matter of any of the previous Examples, comprising a drivetrain to transmit torque from a prime mover of the vehicle to the hub.

Example 11 can optionally include the subject matter of any of the previous Examples, wherein the drivetrain includes a plurality of gears to provide a gear reduction.

Example 12 can optionally include the subject matter of any of the previous Examples, wherein the drivetrain includes a clutch to activate the torque to the thrust generator.

Example 13 can optionally include the subject matter of any of the previous Examples, comprising an electric motor coupled to the hub to turn the hub.

Example 14 can optionally include the subject matter of any of the previous Examples, comprising a rear wheel with a second thrust generator.

Example 15 can optionally include the subject matter of any of the previous Examples, comprising two sets of blades mounted in a wheel, with one set to generate thrust along a first vector, and a second set to generate thrust along a second vector, in a direction opposite the first vector.

Example 16 can optionally include the subject matter of any of the previous Examples, comprising an apparatus for rolling on a surface. The Example can include a frame of a motorcycle. The Example can include a front wheel coupled to the frame configured to pivot around a steering axis. The Example can include a rear wheel coupled to the frame configured to pivot around a steering axis. The Example can include a tilt sensor to measure a tilt of the frame with respect to the surface and produce a tilt signal. The Example can include a thrust generation controller to receive the tilt signal and to produce a desired downforce signal. The Example can include a first thrust generator to receive the desired downforce signal and to pump air through the front wheel to produce lateral force on the front wheel in association with the desired downforce signal. The Example can include a second thrust generator to receive the desired downforce signal and to pump air through the rear wheel to produce lateral force on the rear wheel in association with the desired downforce signal.

Example 17 can optionally include the subject matter of any of the previous Examples, wherein the first thrust generator and the second thrust generator are to produce equal amounts of thrust.

Example 18 can optionally include the subject matter of any of the previous Examples, wherein the first thrust generator and the second thrust generator are to produce different amounts of thrust.

Example 19 can optionally include the subject matter of any of the previous Examples, comprising sensing a lean of a motorcycle. The Example can include determining a desired downforce to apply to the motorcycle. The Example can include signaling to an actuator to actuate a wheel-mounted fan to generate lateral thrust through the wheel.

Example 20 can optionally include the subject matter of any of the previous Examples, wherein signaling the actuator includes signaling to adjust a blade pitch of the wheel-mounted fan.

Each of these non-limiting examples can stand on its own, or can be combined in various permutations or combinations with one or more of the other examples.

The above detailed description includes references to the accompanying drawings, which form a part of the detailed description. The drawings show, by way of illustration, specific embodiments in that may be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is to allow the reader to quickly ascertain the nature of the technical disclosure, for example, to comply with 37 C.F.R. §1.72(b) in the United States of America. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the embodiments should be determined with reference to the appended claims, along with the full scope of equivalents to which such claims are entitled.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus for rolling on a surface, comprising:
   a frame of a vehicle;
   at least two wheels coupled to the frame, wherein at least one of the wheels is configured to pivot around a steering axis;
   a cornering force sensor configured to measure a cornering force of the frame with respect to the surface and produce a cornering force signal;
   a thrust generation controller configured to receive the cornering force signal and produce a desired downforce signal; and
   a thrust generator configured to receive the desired downforce signal and pump air through at least one of the at least two wheels so as to produce lateral force on the wheel in association with the desired downforce signal.

2. The apparatus of claim 1, comprising a tilt sensor configured to measure a tilt of the frame with respect to the surface and produce a tilt signal, wherein the thrust generation controller is configured to receive the tilt signal and pump air through the at least one wheel in association with the tilt signal.

3. The apparatus of claim 2, wherein the cornering force sensor includes the tilt sensor, and the cornering force signal includes the tilt signal.

4. The apparatus of claim 1, comprising a gas permeable shield covering the thrust generator.

5. The apparatus of claim 1, wherein the thrust generator comprises a plurality of hub-mounted blades mounted to a front wheel.

6. The apparatus of claim 5, wherein at least one of the plurality of hub-mounted blades are of an adjustable pitch.

7. The apparatus of claim 6, wherein at least one of the plurality of hub-mounted blades are configured to adjust pitch during a single rotation.

8. The apparatus of claim 6, wherein a hub mounted to the plurality of hub-mounted blades is fixed so as to rotate in parity with the front wheel.

9. The apparatus of claim 6, wherein a hub mounted to the plurality of hub-mounted blades is fixed so as to rotate at a speed other than a speed of rotation of the front wheel.

10. The apparatus of claim 9, comprising a drivetrain configured to transmit torque from a prime mover of the vehicle to the hub.

11. The apparatus of claim 10, wherein the drivetrain includes a plurality of gears to provide a gear reduction.

12. The apparatus of claim 11, wherein the drivetrain includes a clutch to activate the torque to the thrust generator.

13. The apparatus of claim 9, comprising an electric motor coupled to the hub and configured to turn the hub.

14. The apparatus of claim 9, comprising a rear wheel with a second thrust generator.

15. The apparatus of claim 5, comprising two sets of blades, with one set configured to generate thrust along a first vector, and a second set configured to generate thrust along a second vector, in a direction opposite the first vector.

16. An apparatus for rolling on a surface, comprising:
    a frame of a motorcycle;
    a front wheel coupled to the frame configured to pivot around a steering axis;
    a rear wheel coupled to the frame configured to pivot around a steering axis;
    a tilt sensor configured to measure a tilt of the frame with respect to the surface and produce a tilt signal;
    a thrust generation controller configured to receive the tilt signal and produce a desired downforce signal;
    a first thrust generator configured to receive the desired downforce signal and pump air through the front wheel to produce lateral force on the front wheel in association with the desired downforce signal; and
    a second thrust generator configured to receive the desired downforce signal and pump air through the rear wheel to produce lateral force on the rear wheel in association with the desired downforce signal.

17. The apparatus of claim 16, wherein the first thrust generator and the second thrust generator are configured to produce equal amounts of thrust.

18. The apparatus of claim 16, wherein the first thrust generator and the second thrust generator are configured to produce different amounts of thrust.

* * * * *